Dec. 27, 1938. C. M. PIGLIA 2,141,484
PLANT COVER
Original Filed Sept. 10, 1936
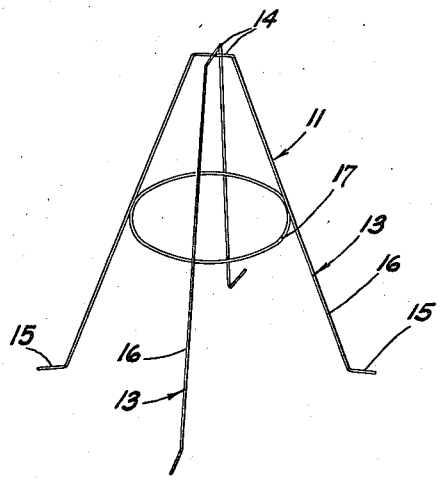
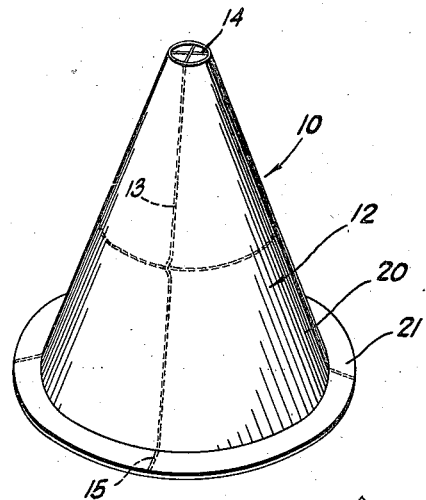
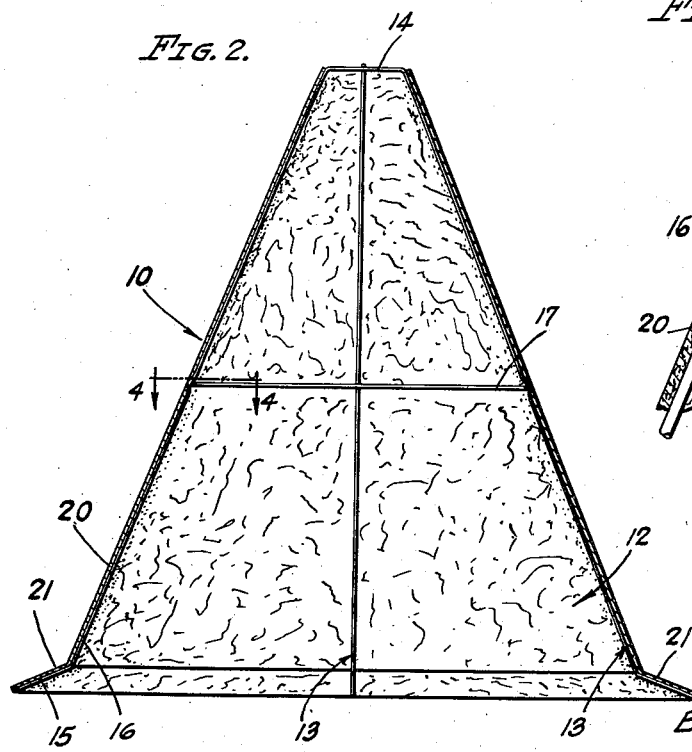
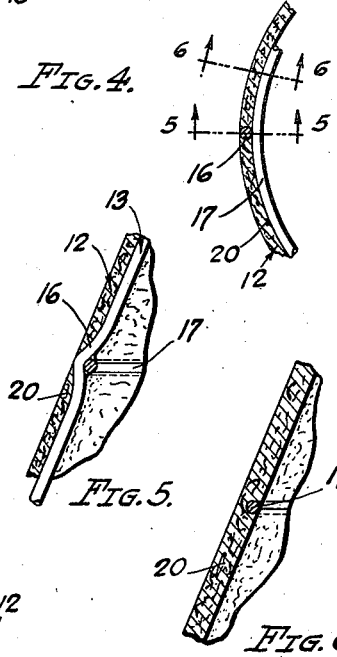
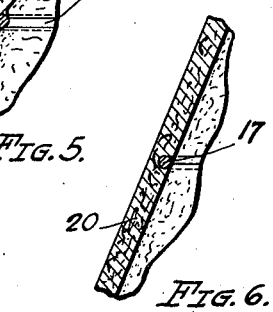
INVENTOR:
CHARLES M. PIGLIA
BY
ATTORNEY.

Patented Dec. 27, 1938

2,141,484

UNITED STATES PATENT OFFICE 2,141,484

PLANT COVER

Charles M. Piglia, Los Angeles, Calif., assignor to Plant Protectors, Inc., Los Angeles, Calif., a corporation of Delaware Application September 10, 1936, Serial No. 100,059
Renewed May 21, 1938

5 Claims. (Cl. 47—28)

This invention relates to the art of plant culture and particularly to plant covers for sheltering young plants in the process of growth.

The use of plant covers to protect the early growth of plants from excessive heat and cold, as well as from wind and rain storms, has become general. One of the factors still standing in the way of universal use of plant covers is the cost of these. It is accordingly an object of my invention to provide a relatively inexpensive plant cover.

Another object of my invention is to provide an inexpensive plant cover which is sturdy in construction and adapted to shelter a plant from extreme weather conditions.

It is a further object of my invention to provide such a plant cover which will nest easily when packed for shipment.

A still further object of my invention is to provide a plant cover which is easily separated from others in a stack for the purpose of handling the plant covers individually in setting these in place on the soil.

The manner of accomplishing the foregoing objects, as well as further objects and advantages, will be made manifest in the following description taken in connection with the accompanying drawing, in which:

Fig. 1 is a perspective view of a preferred embodiment of the plant cover of my invention.

Fig. 2 is an enlarged cross sectional view of Fig. 1.

Fig. 3 is a perspective view of a reinforcing frame embodied in the plant cover of my invention.

Fig. 4 is an enlarged detail cross sectional view taken on the line 4—4 of Fig. 2.

Fig. 5 is a vertical sectional view taken on the line 5—5 of Fig. 4.

Fig. 6 is a vertical sectional view taken on the line 6—6 of Fig. 4.

I shall now refer specifically to the drawing in which is illustrated a plant cover 10 embodying my invention, this cover including a skeleton frame 11 and a seamless concave housing 12.

The frame 11 may be of various forms but is preferably made as shown in Fig. 3 to include a pair of inverted V-shaped members 13 having straight sections 14 at their vertices and feet 15 at their lower extremities. The V-shaped members 13 are preferably united to each other where the straight sections 14 cross each other, as well as having their legs 16 united to a wire ring 17 which may be disposed either inside of or outside of the V-shaped members 13. The frame 11 is preferably formed of wire joined together either by soldering or by spot welding. A plurality of rings 17 of various diameters may be used to connect the straight sections 14 at various levels if a more sturdy construction is desired. It is also contemplated that more than two of the V-shaped members 13 may be used to increase the sturdiness of the frame 11 where this is deemed necessary.

The plant cover 10 is preferably formed by placing the reinforcing frame 11 over a screen conforming to the interior shape of the cover 10, passing this screen through a suspension of wood pulp and simultaneously creating a vacuum inside this screen to cause the pulp to accumulate upon the exterior surface of the screen and surrounding the wires of the reinforcing frame 11. This screen is then removed from this pulp suspension and the layer of pulp collected on the screen is dried and the exterior surface ironed smooth and waterproofed, after which the cover 10 is ready for packing. A complete method and apparatus for manufacturing the plant cover 10 is disclosed in my copending application filed October 5, 1936 and given Serial No. 103,975 and entitled Method of and apparatus for producing plant covers.

The housing 12 formed by the process just outlined includes a conical wall 20 and a flange 21, these of course being formed at the same time by said method so as to be unitary and seamless. Figs. 4, 5 and 6 illustrate approximately how the wires of the reinforcing frame 11 are more or less embedded in the inner surface of the housing 12. This frame, of course, supports the walls 20 of the housing 12 against assaults of wind and rain so as to enable the cover 10 to withstand these natural forces.

From the above description it will be seen that I have provided a very inexpensive plant cover, as well as a very efficient one. The cheapness of my plant cover arises mainly from the fact that paper is not used in this construction but instead the cover is produced directly from wood pulp which is much less expensive than paper.

It is also to be understood that if desired the pulp used in the manufacture of the plant cover 10 may be impregnated with chemicals protecting this against various forms of mold and insect attack. The water proofing of the housing 12 may be effected by application thereto of a thin coating of paraffin or other water resistant material such as light petroleum oil.

What I claim is:

1. As an article of manufacture, a plant cover comprising a seamless concave housing adapted to overlie a plant; and a filamentary reinforcement conforming to the concave shape of said housing and snugly confined within said housing.

2. As an article of manufacture, a plant cover comprising a seamless housing formed of pulp fibers originally assembled in a concave shape so as to be adapted to overlie and shield a plant when edge portions of said plant cover rest on the ground; and a filamentary reinforcement conforming to the concave shape of said housing and snugly confined within said housing.

3. As an article of manufacture, a plant cover comprising a seamless housing formed of pulp fibers originally assembled in a concave shape so as to be adapted to overlie and shield a plant when edge portions of said plant cover rest on the ground; and a basket like reinforcement of filamentary material such as wire or the like, said reinforcement conforming to the concave shape of said housing and being at least partially embedded in the material of said housing.

4. As an article of manufacture, a plant cover comprising a seamless cone; and a conical reinforcement frame formed of a relatively stiff filamentary material and embedded in inside faces of said cone.

5. As an article of manufacture, a plant cover comprising a seamless cone with a flange about the base thereof, said cone and flange being formed of pulp fibers originally assembled in conical shape; and a conical reinforcement frame formed of a relatively stiff filamentary material and embedded in inside faces of said cone and the lower face of said flange.

CHARLES M. PIGLIA.